United States Patent [19]
Ho

[11] Patent Number: 5,870,632
[45] Date of Patent: Feb. 9, 1999

[54] LEAKAGE DETECTOR

[76] Inventor: Kenneth Kam-Sing Ho, c/o Bonica Precision (Canada) Inc., 201-2691 Viscount Way, Richmond, British Columbia, Canada, V6V 1M9

[21] Appl. No.: 819,339

[22] Filed: Mar. 18, 1997

[51] Int. Cl.$^6$ .................................................. G03B 17/08
[52] U.S. Cl. .............................................................. 396/26
[58] Field of Search ......................................... 396/25, 26

[56] References Cited

U.S. PATENT DOCUMENTS 4,763,145  8/1988  Takamura et al. ........................ 396/26
4,853,722  8/1989  Gell, Jr. .................................... 396/26

*Primary Examiner*—David M. Gray
*Attorney, Agent, or Firm*—Paul A. Guss; Mark M. Yang

[57] ABSTRACT

To test the integrity of waterproof casings for cameras and like apparatus to be used underwater, a casing with a detector is provided. The air inside the casing is pressurized and the detector indicates leakage based on the difference between the pressurized air and atmospheric pressure. A decrease in pressure of the initial level of pressurized air implies leakage.

20 Claims, 6 Drawing Sheets

(Sectional View II-II)

(Sectional View II - II)

(Sectional View II - II)

LEAKAGE DETECTOR

FIELD OF INVENTION

This invention relates to the detection of leakage in a cases based on sensing changes in the air pressure.

BACKGROUND OF INVENTION

Airtight or waterproof cases are used to enclose cameras and other sensitive apparatus to protect them from their operating environment external thereto which may have moisture, dust, gases and other harmful elements. Cases may suffer from manufacturing defects and may consequently leak.

Detection of leaks in supposedly waterproof casings has been conventionally attempted by detecting the presence of moisture. Schwomma (U.S. Pat. No. 4,312,580) is a representative example. Not only are moisture detectors difficult and expensive to build and maintain, the detection of moisture comes often too late (e.g. moisture has already entered the casing).

As well, detection of leaks has been conventionally attempted by observing changes in the air pressure inside the casing after artificially increasing it. Hayakawa (U.S. Pat. No. 5,305,031) is a representative example. One defect of such attempts is that the means for increasing the air pressure and detecting changes, is itself a potential source of leakage in addition to possible leakage in the cases. For example, after using the Hayakawa device to test the integrity of the cases, it is neither clear that the "self-closing" seal will maintain its integrity nor how to test for that post-testing integrity.

SUMMARY OF INVENTION

To address the above defects with the conventional approaches, this invention provides a case comprising: (a) sealed housing with an outer wall; and (b) a leakage detector firmly located in said wall having: (i) a chamber with first and second sub-chambers; (ii) first port means by which said first sub-chamber communicates with the environment; (iii) second port means by which said second sub-chamber communicates with the environment; (iv) a partition separating said first sub-chamber from said second sub-chamber which moves in response to the difference in the respective air pressures of said first and second sub-chamber; and (v) indicator means, located proximate said partition and responsive to movement of said partition, for indicating leakage.

To address the above defects with the conventional approaches, this invention provides a leakage detector for a sealed housing With an outer wall, comprising: (i) a chamber with first and second sub-chambers; (ii) first port means by which said first sub-chamber communicates with the environment; (iii) second port means by which said second sub-chamber communicates with the environment; (iv) a partition separating said first sub-chamber from said second sub-chamber which moves in response to the difference in the respective air pressures of said first and second sub-chamber; and (v) indicator means, located proximate said partition and responsive to movement of said partition, for indicating leakage.

To address the above defects with the conventional approaches, this invention provides a method of detecting leakage in a case, comprising the steps of: (a) creating a first sub-chamber of pressurized air in communication with the interior of the case; (b) creating a second sub-chamber of air; (c) abutting a portion of said first sub-chamber with a portion of said second sub-chamber where the abutment is in the form of a membrane whose profile changes in response to the relative differences in air pressures of said first and second sub-chambers.

BRIEF DESCRIPTION OF DRAWINGS

Advantages of the present invention will become apparent from the following detailed description taken in conjunction with preferred embodiments shown in the accompanying drawings, in which.

DETAILED DESCRIPTION OF THE PREFERRED EMBODIMENTS

Figure 1:
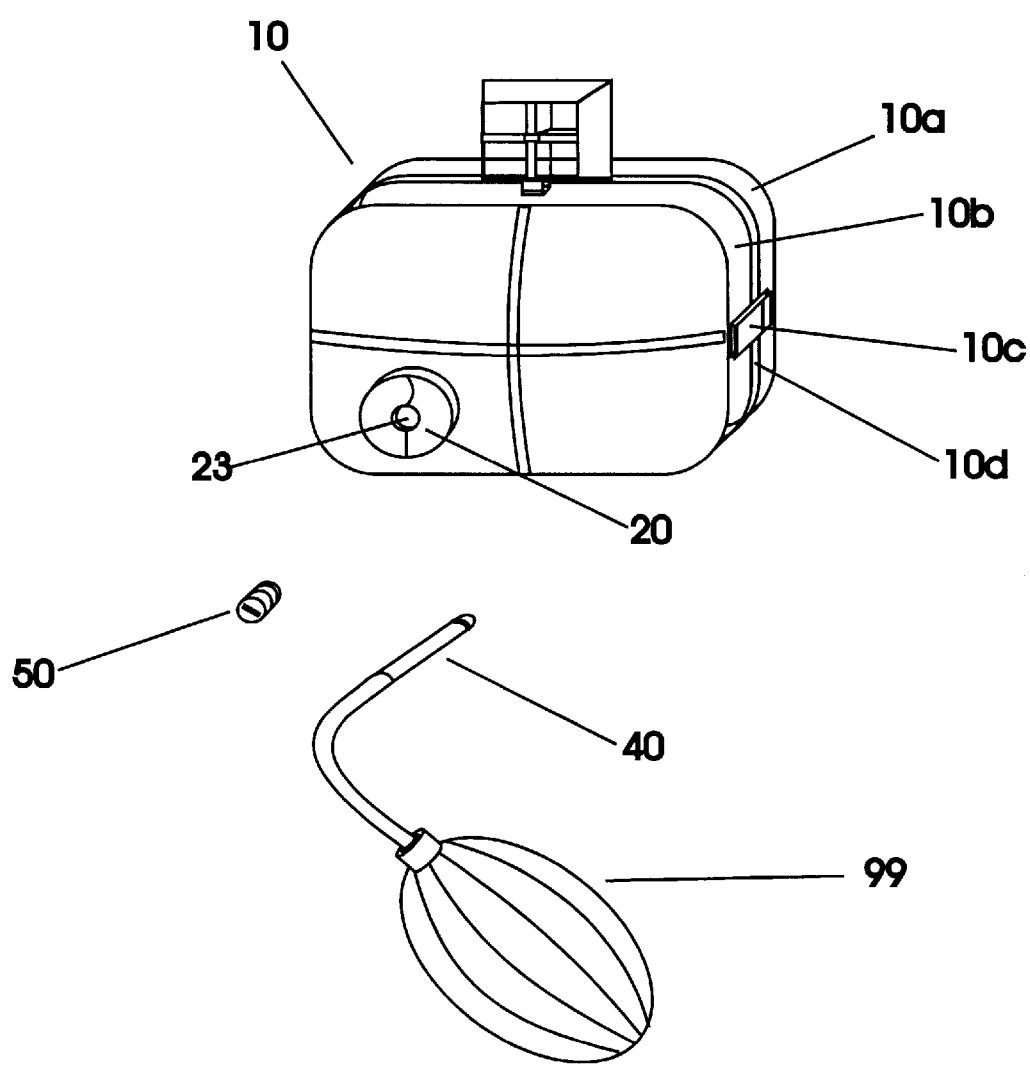
FIG. 1 is a rear perspective view of an underwater camera housing employing a leakage detector according to the present invention.

FIG. 1 shows underwater camera housing 10, which has front part 10a and rear part 10b held together by several spring-loaded latches (one, 10c, is shown in FIG. 1). Silicon or rubber O-ring 10d provides a waterproof seal between front and rear parts 10a and 10b when latched together. Leakage detector 20 is connected to housing 10 at hole 15 in rear part 10b (explained below). Leakage detector 20 has several purposes, in addition to detecting leakage. To pressurize the air in housing 10, plastic hand or finger pump 99, is employable with leakage detector 20 through injector head 40. Leakage detector 20 is plugged with plug 50.

Figure 2:
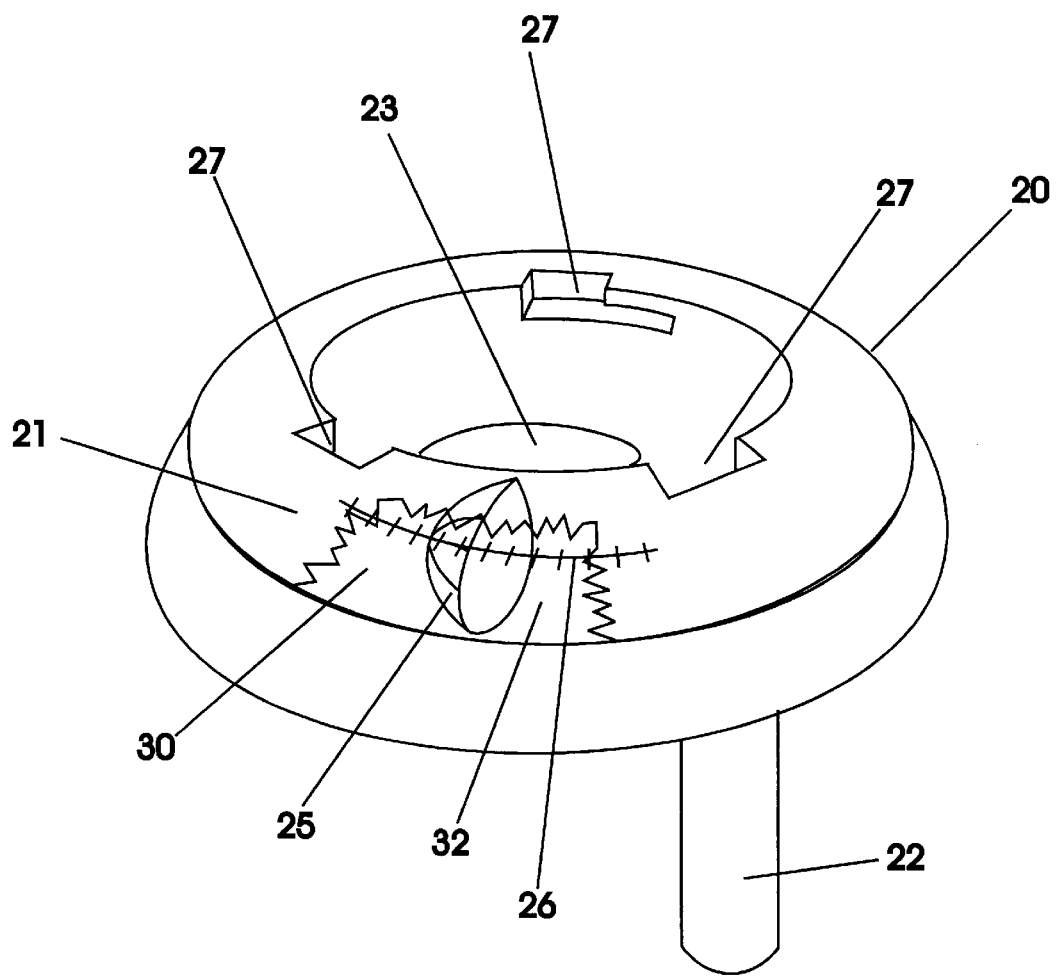
FIG. 2 is a perspective view of the leakage detector according to the present invention.
Figure 3A:
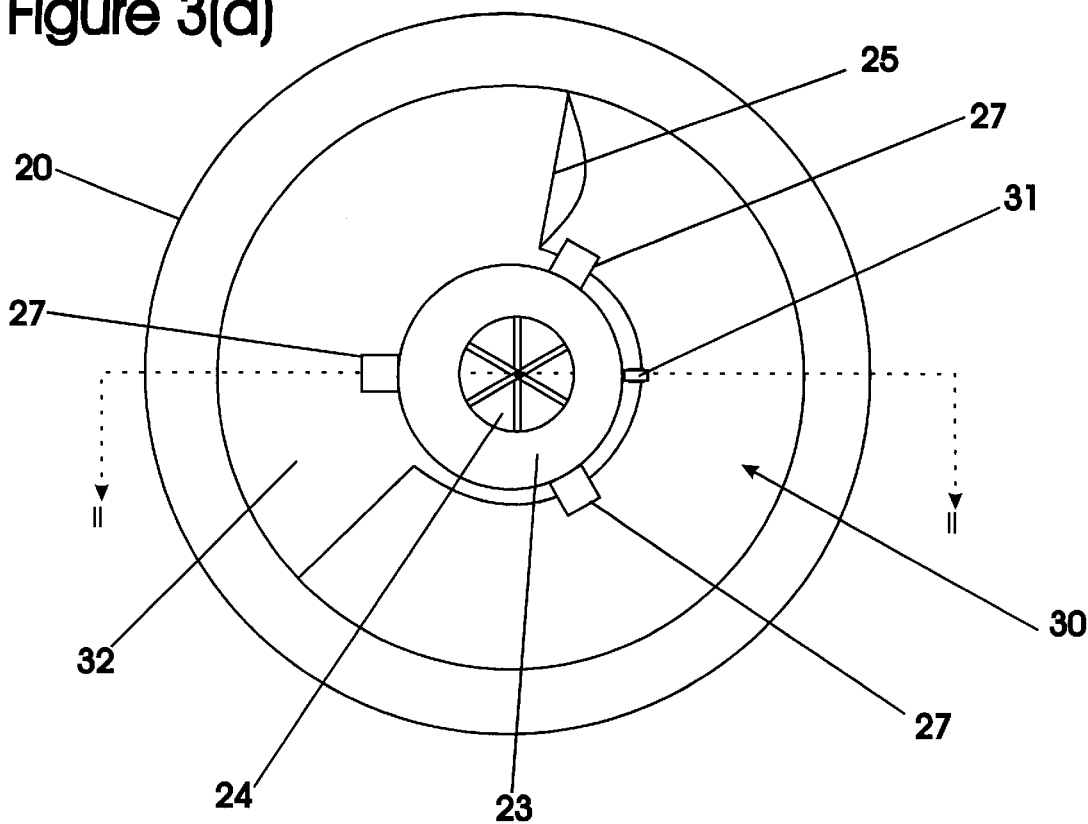
FIG. 3(a) is a top view of the detector of FIG. 2.
Figure 3B:
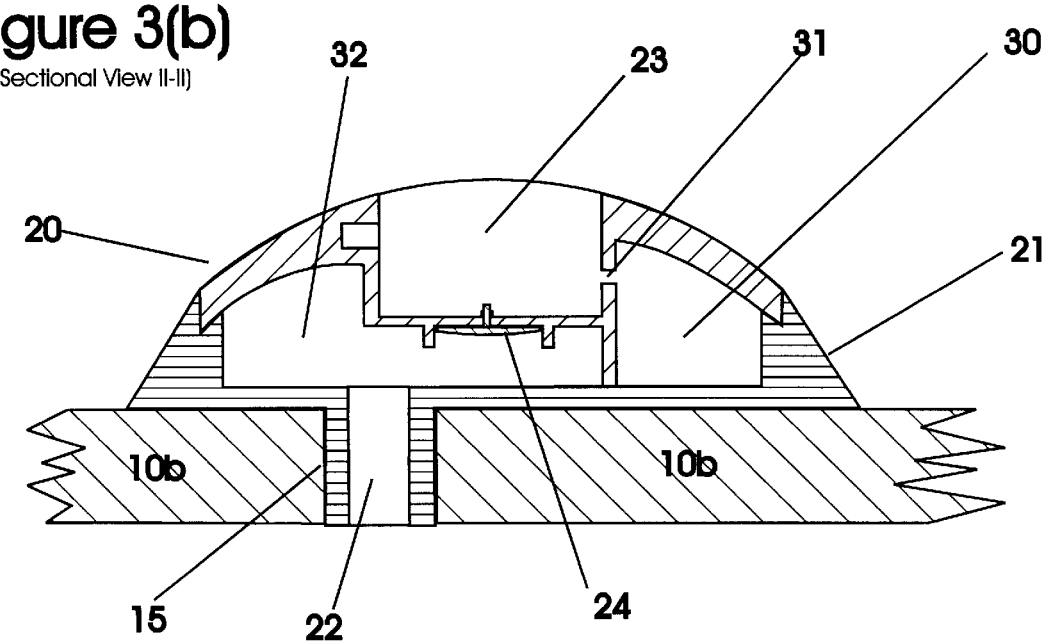
FIG. 3(b) is a side view of the detector of FIG. 3(a) taken along line B—B.

As shown in FIGS. 2 and 3, detector 20 has a convex, annular upper body 21 with a central port 23 to receive injector head 40 or plug 50 (explained below), and a hollow stem 22 depending downwardly. Stem 22 and hole 15 are respectively profiled to create a tight friction fit when stem 22 is inserted in hole 15 and the connection is conventionally sealed with glue, O-rings and ultrasonically bonded. The base of body 21 is profiled to hug rear part 10b in a flush manner. Body 21 has three sockets 27 which interact with corresponding wings 28 of injector head 40 or plug 50 (explained below) to create a tight interlock therewith. Within body 21 is elastic membrane 25 (explained below) and the portion of body 21 proximate membrane 25 is transparent and has a visible scale of graduations 26 to permit viewing of the profile of membrane 25 relative thereto (as shown in FIG. 2).

Body 21 has atmospheric sub-chamber 30, in the shape of a partial torus, in communication with the environment by sub-chamber port 31 and detector central port 23. Body 21 has pressurized sub-chamber 32, in the shape of a partial torus, in communication with the interior of housing 10 through stem 22. Detector central port 23 communicates with sub-chamber 32 by a one-way valve 24. Atmospheric sub-chamber 30 is separated from pressurized sub-chamber 32 by flexible membrane 25. As the air pressure in sub-chamber 32 increases above atmospheric pressure, the profile of membrane 25 will change. From an initial flat profile, membrane 25 will curve or bulge inwardly into atmospheric sub-chamber 30. The profile of membrane 25, and in particular the crown of a bulged profile, is visible to the user through the transparent portion of body 21 relative to graduations 26 thereon. One particular graduation may signify the appropriate pressure for testing particular housing 10. Generally, the graduations are usable as visual markers and the exact significance of any particular graduation can be determined by the user based on the particular housing being tested.

Figure 4A:
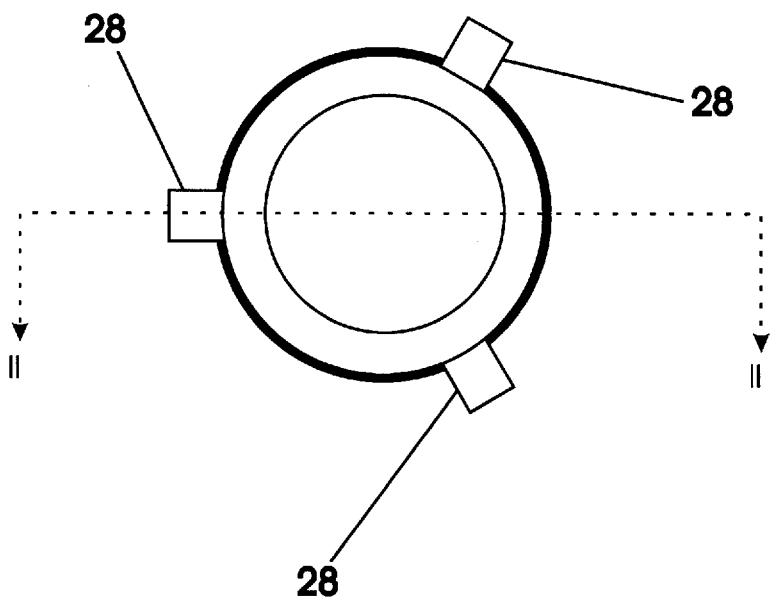
FIG. 4(a) is a top view of the injector head of the present invention.
Figure 4B:
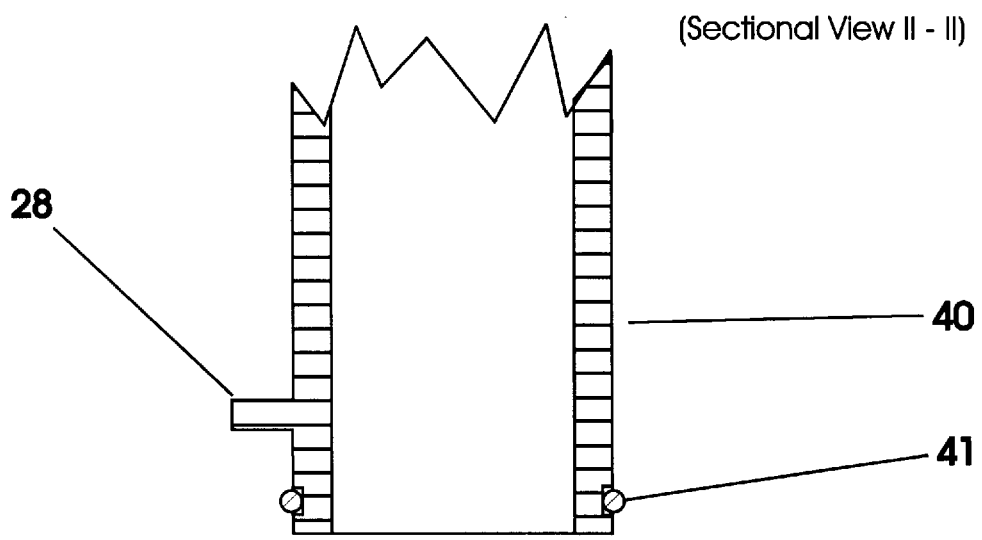
FIG. 4(b) is a side view of the injector head of FIG. 4(a) taken along line B—B.

Injector head 40, as shown in FIG. 4, has O-ring 41 and three equi-spaced wings 28 which interact with corresponding sockets 27 of detector 20 for a bayonet or similar type secured interlock with detector central port 23.

Figure 5A:
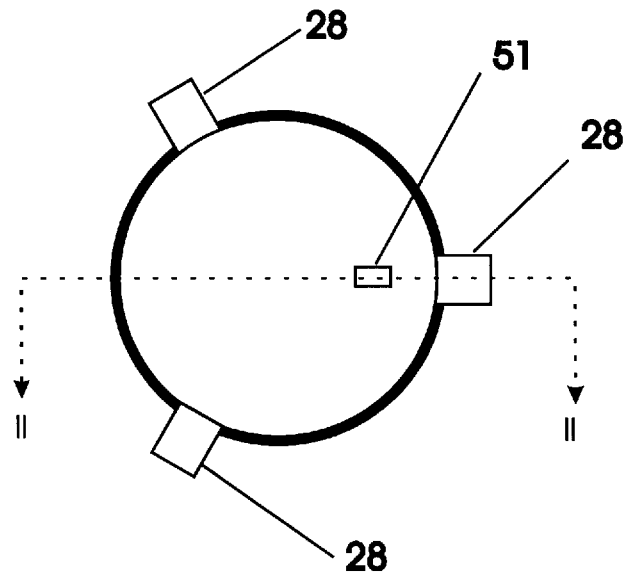
FIG. 5(a) is a top view of the plug of the present invention.
Figure 5B:
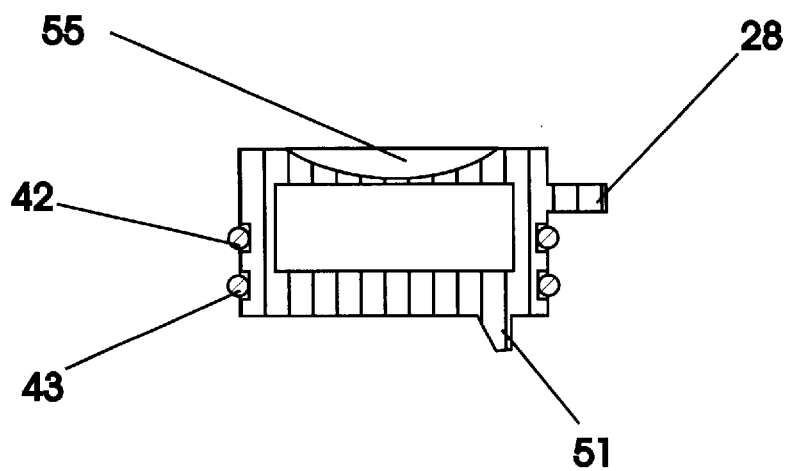
FIG. 5(b) is a side view of the plug of FIG. 5(a) taken along line B—B.

Plug 50, as shown in FIG. 5, has a bottom protuberance 51, upper O-ring 42 and lower O-ring 43, and three equi-spaced wings 28 which interact with corresponding sockets 27 of detector 20 for a bayonet or similar type interlock with detector central port 23. Upper O-ring 42 and lower O-ring 43 are disposed on plug 50 such that when plug 50 is inserted and secured in detector central port 23, upper O-ring 42 and lower O-ring 43 bracket sub-chamber port 31. Protuberance 51 is located on plug 50 so that when plug 50 is inserted and secured in detector central 23, protuberance 51 pushes down and thereby opens valve 24 to permit air from pressurized sub-chamber 32 to enter detector central port 23.

Plug 50 also has a gripping means 55, which may be a coin slot or plastic handle which the user may easily manipulate to insert and secure the wing-socket interlock mentioned above.

Figure 6:
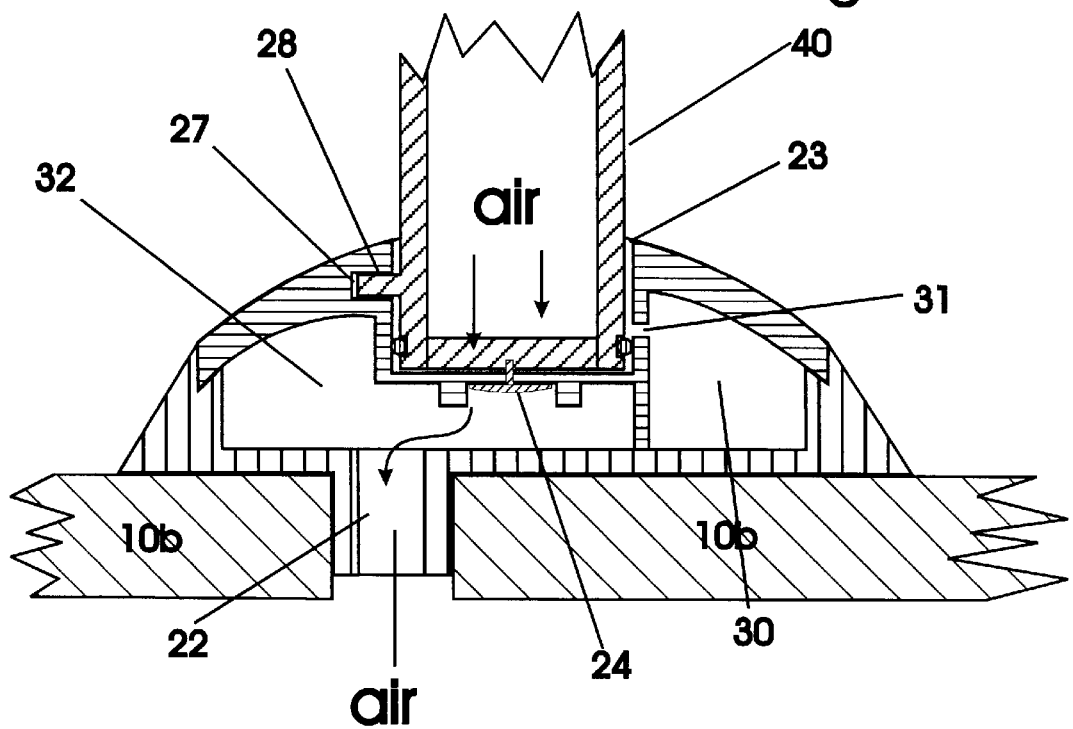
FIG. 6 is a side view of the injector head inserted into the detector.
Figure 7:
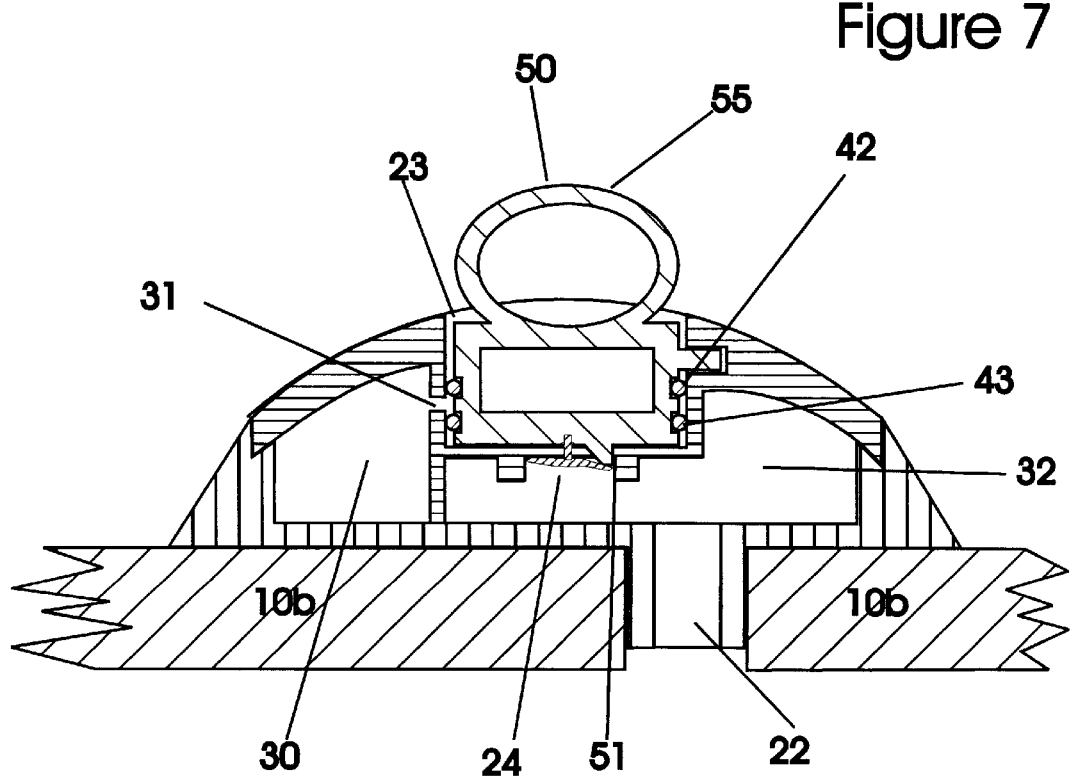
FIG. 7 is a side view of the plug inserted into the detector.

As shown in FIG. 6, the user drills a hole in housing 10 rear part 10b with a suitable profile to accept stem 22 of detector 20 in a tight friction fit (and sealed as described above); inserts detector 20 and then inserts injector head 40 into detector central port 23. O-ring 41 is disposed below sub-chamber port 31 so that atmospheric sub-chamber 30 is in direct communication with the environment. By user manipulation of pump 99, air is forced through valve 24, into sub-chamber 32 and then into the interior of housing 10. The resulting increased air pressure will tend to create a curved profile of membrane 25 and the extent of curve will be visible to the user relative to graduations 26. The user will stop pressurizing at a suitable pressure level (after considering the movement of membrane 25 relative to graduations 26, membrane 25 will have its initial profile), withdraw injector head 40, and insert and insert and secure plug 50 in detector central port 23, as shown in FIG. 7. The user will observe if membrane 25 changes its initial curved profile. If there is leakage in housing 10, the air pressure in pressurized sub-chamber 32 will decrease and the curved profile will flatten. A suitable period to observe for changes depends on factors like the confidence level sought by the user.

The opening of valve 24 by protuberance 51 (as explained above) allows pressurized air from pressurized sub-chamber 32 to move into the tiny cracks between plug 50 and proximate portions of detector central port 23 which are circumscribed from above by lower O-ring 43. If the seal created by lower O-ring 43 leaks, air will escape through sub-chamber port 31 into atmospheric sub-chamber 30. The result will be a decrease in pressure in sub-chamber 32 and a corresponding change in profile of membrane 25 can be detected by the user. In such a condition, even if the seal of upper O-ring 42 was sufficient to prevent leakage, a change in the profile of membrane 25 would be interpreted as a warning to the user to consider replacing plug 50 because lower O-ring 43 had failed. Also, although atmospheric sub-chamber 30 is typically in communication with the atmosphere during testing for leakage, the operating environment of detector 20 in housing 10 typically has hostile elements and therefore, atmospheric sub-chamber 30 is advantageously sealed therefrom by upper O-ring 42.

Thus it is seen that beyond naturally doubling the integrity of the seal of plug 50, having a pair of O-rings 42 and 43 configured as described above, provides additional benefits.

The profile of membrane 25 that indicates the absence of leakage (i.e. the constancy of the profile from the initial curve of membrane 25) will be present only if there is no leakage in housing 10 and no leakage in detector 20. Upon detection of leakage, suitable corrective action can be taken. For example, during the quality checking process as the last step in the manufacture of housings, a particular housing 10 which leaked can be rejected or returned for correction. After successful manufacture and testing (e.g. while it is stored in inventory or being transported), housing 10 equipped with detector 20 provides continuous detection of leakage, whether of housing 10 or plug 50.

For example, housing 10 for a camera may be dimensioned 6"×4"×2" and made of polycarbonate. Detector 20 may be dimensioned 1" in diameter and body may be ½" in height and made mainly of polycarbonate.

Sub-chamber 30 may be a part toroidal-shaped cylinder with one end closed and the other end open. Sub-chamber 32 may be similarly constructed. Sub-chambers 30 and 32 are joined at their open ends and separated by membrane 25, which may a sheet of elastic material covering one open end and sealed conventionally. Membrane 25 may be made of such elastic material and dimensions, and secured in place, as are appropriate for the particular application but in any case, membrane 25 must be sufficiently strong to provide an air tight separation between sub-chambers 30 and 32 even while being sufficiently flexible to bulge without undue air pressure. For example, membrane 25 may be latex rubber or silicon sheet which is bracketed conventionally over the open end of pressurized sub-chamber 32. Membrane 25 and its connection should be able to withstand pressure up to 8 psi for testing housing 10 for a typical camera.

Valve 24 may be a conventional silicon or rubber one-way valve but biasing on springs or other conventional means are possible as long as the self-closing sealing action is quick.

It will be appreciated that the dimensions given are merely for purposes of illustration and are not limiting in any way. The specific dimensions given may be varied in practising this invention, depending on the specific application.

While the principles of the invention have now been made clear in the illustrated embodiments, there will be immediately obvious to those skilled in the art, many modifications of structure, arrangements, proportions, the elements, materials and components used in the practice of the invention, and otherwise, which are particularly adapted for specific environments and operational requirements without departing from those principles. The claims are therefore intended to cover and embrace such modifications within the limits only of the true spirit and scope of the invention.

What is claimed is:

1. A case comprising:

(a) sealed housing with an outer wall; and
(b) a leakage detector firmly located in said wall having:
  (i) a chamber with first and second sub-chambers;
  (ii) first port means by which said first sub-chamber communicates with the environment external to the case;
  (iii) second port means by which said second sub-chamber communicates with the environment external to the case;
  (iv) a partition separating said first sub-chamber from said second sub-chamber which moves in response to the difference in the respective air pressures of said first and second sub-chamber; and
  (v) indicator means, located proximate said partition and responsive to movement of said partition, for indicating leakage.

2. The case of claim 1, wherein said partition includes a flexible membrane.

3. The case of claim 1, wherein said detector has a transparent portion so that said partition movement is visible to a user.

4. The case of claim 1, wherein said second port means has a self-closing, unidirectional valve which mediates between said second sub-chamber and the environment external to the case in response to pressure directed into said second sub-chamber.

5. The case of claim 1 further comprising injection means for injecting air from the environment external to the case through said second port means and into said second sub-chamber to increase the air pressure therein.

6. The case of claim 2 further comprising injection means for injecting air from the environment external to the case through said second port means and into said second sub-chamber to increase the air pressure therein.

7. The case of claim 3 further comprising injection means for injecting air from the environment external to the case through said second port means and into said second sub-chamber to increase the air pressure therein.

8. The case of claim 4 further comprising injection means for injecting air from the environment external to the case through said second port means and said valve into said second sub-chamber to increase the air pressure therein.

9. The case of claim 1, wherein said detector further comprises a plug insertable into and securable to said second port means which, when secured, creates a seal between the environment external to the case and said second sub-chamber.

10. The case of claim 2, wherein said detector further comprises a plug insertable into and securable to said second port means which, when secured, creates a seal between the environment external to the case and said second sub-chamber.

11. The case of claim 3, wherein said detector further comprises a plug insertable into and securable to said second port means which, when secured, creates a seal between the environment external to the case and said second sub-chamber.

12. The case of claim 4, wherein said detector further comprises a plug insertable into and securable to said second port means which, when secured, creates a seal between the environment external to the case and said second sub-chamber.

13. The case of claim 9, wherein said plug is configured to open said valve to release air from said second sub-chamber when said plug is secured to said second port means.

14. The case of claim 10, wherein said plug is configured to open said valve to release air from said second sub-chamber when said plug is secured to said second port means.

15. The case of claim 11, wherein said plug is configured to open said valve to release air from said second sub-chamber when said plug is secured to said second port means.

16. The case of claim 12, wherein said plug is configured to open said valve to release air from said second sub-chamber when said plug is secured to said second port means.

17. The case of claim 16, wherein said plug has first sealing means and second sealing means which, when secured to said second port means, (i) bracket said first port means so as to prevent leakage between said first sub-chamber and the environment, and (ii) seal said second sub-chamber from said first sub-chamber and the environment external to the case.

18. A leakage detector for a sealed housing with an outer wall, comprising:
  (i) a chamber with first and second sub-chambers;
  (ii) first port means by which said first sub-chamber communicates with the environment external to the case;
  (iii) second port means by which said second sub-chamber communicates with the environment external to the case;
  (iv) a partition separating said first sub-chamber from said second sub-chamber which moves in response to the difference in the respective air pressures of said first and second sub-chamber; and
  (v) indicator means, located proximate said partition and responsive to movement of said partition, for indicating leakage.

19. The detector of claim 18, wherein said partition includes a flexible membrane and the detector has a portion proximate said membrane to permit a user to view movement of said membrane.

20. A method of detecting leakage in a case, comprising the steps of:
  (a) creating a first sub-chamber in communication with the environment external to the case;
  (b) creating a second sub-chamber of pressurized air in communication with the interior of the case and with the environment external to the case;
  (c) abutting a portion of said first sub-chamber with a portion of said second sub-chamber, where the abutment takes the form of a partition which moves in response to a difference in respective air pressures of said first and second sub-chambers.

* * * * *